United States Patent

Richter

[15] 3,693,707
[45] Sept. 26, 1972

[54] FRACTIONAL DESUBLIMATION
[72] Inventor: Guenther Richter, Gladbeck, Germany
[73] Assignee: Gelsenberg Benzin Aktiengesellschaft, Gelsenkirchem, Germany
[22] Filed: April 12, 1971
[21] Appl. No.: 133,130

Related U.S. Application Data

[60] Division of Ser. No. 784,284, Dec. 9, 1968, and a continuation-in-part of Ser. No. 784,284, Dec. 9, 1968.

[30] Foreign Application Priority Data

Dec. 9, 1970 Germany..........P 16 68 161.1

[52] U.S. Cl. .....................165/39, 161/111, 161/101
[51] Int. Cl. .............................................B60h 1/00
[58] Field of Search............165/1, 11, 12, 39, 40, 74, 165/101

[56] References Cited

UNITED STATES PATENTS 3,559,723  2/1971  Mann et al.....................165/2
3,609,943  12/1968  Richter......................165/111

*Primary Examiner*—Charles Sukalo
*Attorney*—Burgess, Dinklage & Sprung

[57] ABSTRACT

Separation of a component contained in a gas, by desublimation is carried out in a separator outfitted with a plurality of tube coils interposed so that turns of one coil are disposed between turns of another coil. The coils are connected in parallel so that coolant can be passed in timed sequence, successively through the coils, changing the coils used for cooling in accordance with build up of sublimate on the turns to maintain in cooling service coils not bearing excessive sublimate. The turns of each coil can be uniformly spaced, and said spacing for each coil can be the same. Said spacing can be selected to provide the residence time adjacent the separator outlet necessary to provide the desired degree of separation. Thereby, in effect, fractionation as well as separation can be realized, i.e. a sublimate of high purity can be produced. The invention is particularly effective for separation of pyromellitic acid dianhydride.

14 Claims, 4 Drawing Figures

(II-II)

FRACTIONAL DESUBLIMATION

This application is a division and continuation-in-part of application Ser. No. 784,284, filed Dec. 9, 1968. Said prior application is incorporated herein by reference.

BACKGROUND

According to the state of the art, desublimators are used in catalytic gaseous phase oxidation processes, which primarily cool the vapor-gas mixture down to a point above the water dew point created by the process, without the occurrence of any fractionation. These desublimators are mainly designed for the achievement of a good temperature gradient through the selection of certain velocities over the finned tube, and the spacing between the rows of finned tubes is selected on the basis of criteria relating to construction and production.

In the thermotechnical design of the prior art desublimators and hence in determining the heat-exchange areas $$F = \frac{Q}{k \cdot tm} \left[ \frac{k_{cal}/h}{\frac{k_{cal} \cdot \text{degrees}}{m^2 \cdot h \cdot \text{degree}}} \right]$$

average heat transfer numbers of 3 to 10 kcal/$m^2 \times h \times$ degree are used, since the heat transfer varies as the incrustation of the finned tubes increases.

It is known that, in the case of the oxidation mixtures producted in catalytic processes, the dew point of the component to be recovered is lower than its melting point and therefore the said component desublimates mostly in the form of a solid substance.

By desublimation is meant the direct transition from the vaporous aggregate state to the solid state.

If the desublimation process is studied with reference to a pressure-temperature diagram, it is known that, when a mixture of vapor and gas cools at a constant pressure lower than its triple-point pressure, crystals do not precipitate immediately when the sublimation curve is passed, just as crystals do not form immediately when a solution is cooled past the saturation curve.

THE INVENTION

For the performance of the process of the invention, it is necessary not only to achieve a slight supercooling within certain limits, but also to control certain other influential factors, in order to make possible a fractional desublimation which, as mentioned, permits the separation of a fraction of high purity.

One of these influential factors is the time of stay at the dew point.

In oxidation plants of the prior art which operate on a large technical scale, finned tube heat exchangers and also large chambers are used as desublimators. These are usually followed by expensive purification apparatus (e.g., vacuum stills) for the purpose of arriving at a salable product of high purity.

In the case of some desublimation products, especially pyromellitic acid dianhydride, however, the conventional purification processes fail or they produce uneven results. Furthermore, the desublimate of prior art processes has a tendency to decompose and hence to discolor under thermal stress.

It has now been found that it is possible by fractional desublimation to obtain substantially pure anhydrides from vapor-gas mixtures having a high content of polycarboxylic acid anhydrides if the corresponding surface temperature on the finned tube or at the exchange surface, as the case may be, is adjusted to the corresponding dew point of the desired component This process is especially suitable for the separation of pyromellitic acid dianhydride. The necessary desublimation temperatures are determined by means of an enthalpy-concentration diagram.

Lastly, it has been found that the spacing of the rows of finned tubes from one another, and hence the time of stay at the dew points, has to be determined at least on the basis of the existing degree of saturation, the lower concentrations at the gas output requiring a longer time of stay at the dew point than the greater concentrations at the gas input.

It is known that the time of stay of the vapor-gas mixture in the desublimator is proportional to the capacity of the desublimator casing and inversely proportional to the volumetric rate of flow of the vapor-gas mixture.

The construction of a separating apparatus on the basis of the above-described discoveries requires a time of stay at the dew points which increases as the concentration of the polycarboxylic acid anhydrides in the vapor-gas mixture decreases.

The desublimators according to the invention are designed on the basis of the following considerations: the area of the exchange surface depends on the amount of heat that has to be removed, which is determined by the process conditions. Also fixed is the concentration of the polycarboxylic acid anhydrides in the vapor-gas mixture, which predetermines the dew point temperature at the gas input. On the basis of fractometric analysis, the fraction that is to be separated, and hence the composition at the gas output, is known. The dew point temperature at the gas output or at the last row of finned tubes participating in the heat exchange is determined by the composition of the vapor-gas mixture leaving the desublimator.

On account of the time-dependence of the desublimation, the required time of stay determines the size of the casing that envelopes the heat exchanger. Too long a time of stay at the dew points calls for an excessively large casing, relatively speaking. Too short a time of stay at the dew points, however, impairs the degree of separation. Increasing the size of the desublimator casing impairs the yield per unit-time. To improve the yields per unit-time, the apparatus and process of the invention is provided, which is described hereinafter and which permits the separation of a highly pure fraction.

A desublimator, constructed on the basis of the knowledge on which the invention is based, contains portions of heat exchange surface alternating with portions of the detention space in which no heat exchange takes place. The final concentration desired at the gas discharge is used in determining the finned tube spacing. Even if this spacing is greater than necessary in the vicinity of the gas input (since the concentration is greater towards the gas input) it nevertheless does not impair the fractionation. No doubt it makes the desublimator casing larger in size, but nevertheless it results in the advantage of being able to house more

SUMMARY OF THE INVENTION

Thus, the invention provides a process for desubliming a component in a gas. The invention includes the steps of introducing the gas into a separator comprising an elongated housing having an inlet for introduction of the gas adjacent one end thereof and an outlet for withdrawal of the gas adjacent the other end thereof. The separator includes a first cooling battery and a second cooling battery disposed in the housing, each of said batteries comprising a heat exchange tube coil providing tubes along the path of the gas from the inlet to the outlet. The successive tubes of the tube coils of the first battery are interposed between successive tubes of the tube coils of the second battery, and the tubes of each coil are uniformly spaced from each other. Coolant is passed through the tube coils for desublimation by the first battery, whereupon sublimate accumulates on the tube coils of the first battery. During this time, no coolant is passed through the tube coil of the second battery, or at least the second battery is operated so that relatively little sublimate accumulates thereon. After accumulation of sublimate on the tube coils of the first battery to the point that heat transfer by the first battery is inefficient, the first battery can be shut down, and coolant passed through the tube coils of the second battery, for deposit of sublimate thereon.

Following substantial accumulation of sublimate on both batteries, the desublimating operation can be interrupted and the sublimate removed from both batteries. Then, the operation can be repeated.

EMBODIMENTS

The invention is further explained with reference to the accompanying drawings wherein.

Figure 1:
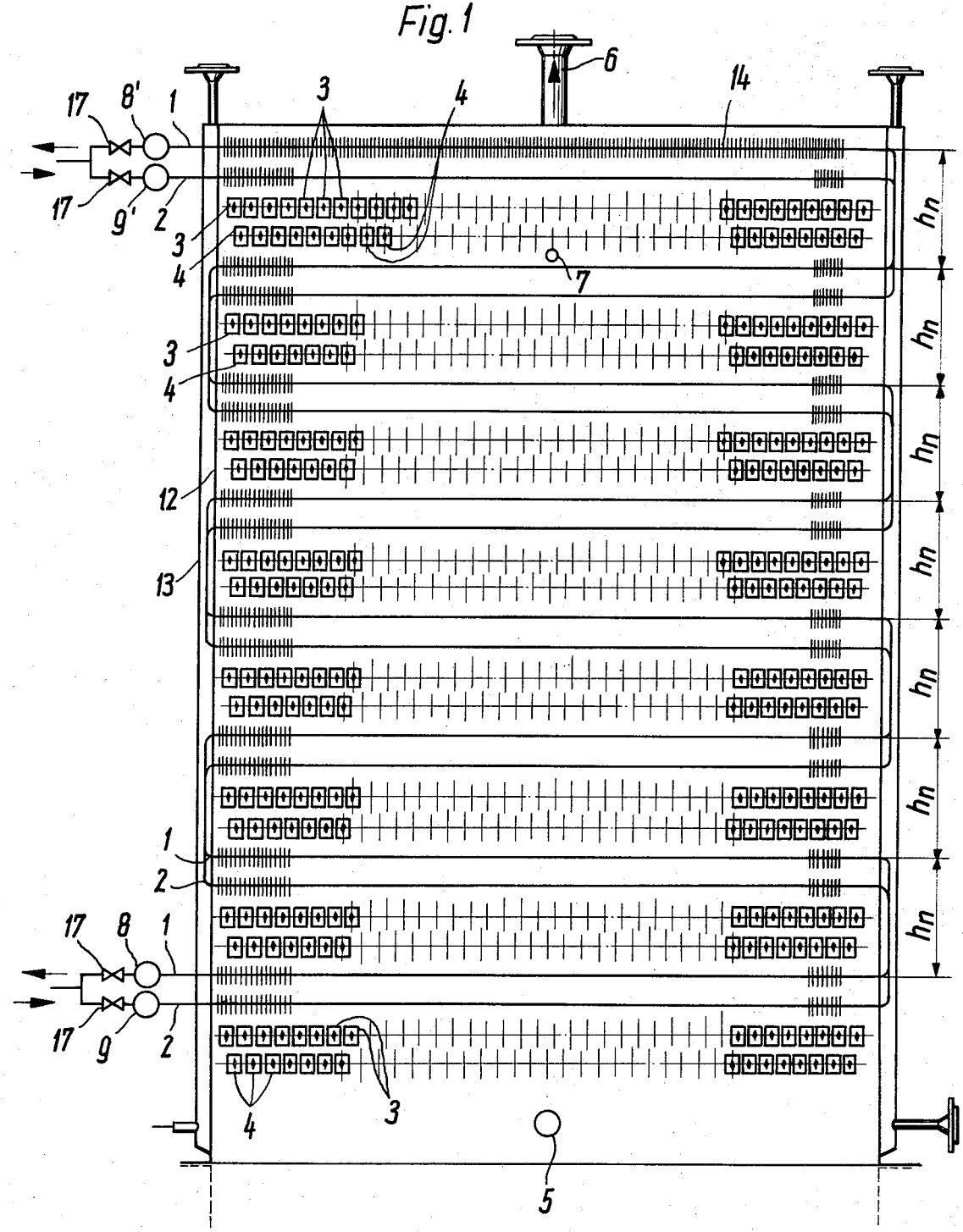
FIG. 1 is a vertical cross section through a box-shaped desublimator having four heat exchanger batteries or systems.

In the drawings, the heat exchanger batteries or systems made up of pipe coils are identified as 1, 2, 3 and 4, the gas input as 5, the gas discharge as 6, the temperature measuring connection as 7, the header pipes as 8, 9, 10 and 11 (Fig. 1, 1a and Fig. 2), the desublimator casing as 12, a jacket as 13, and fins as 14.

Figure 1A:
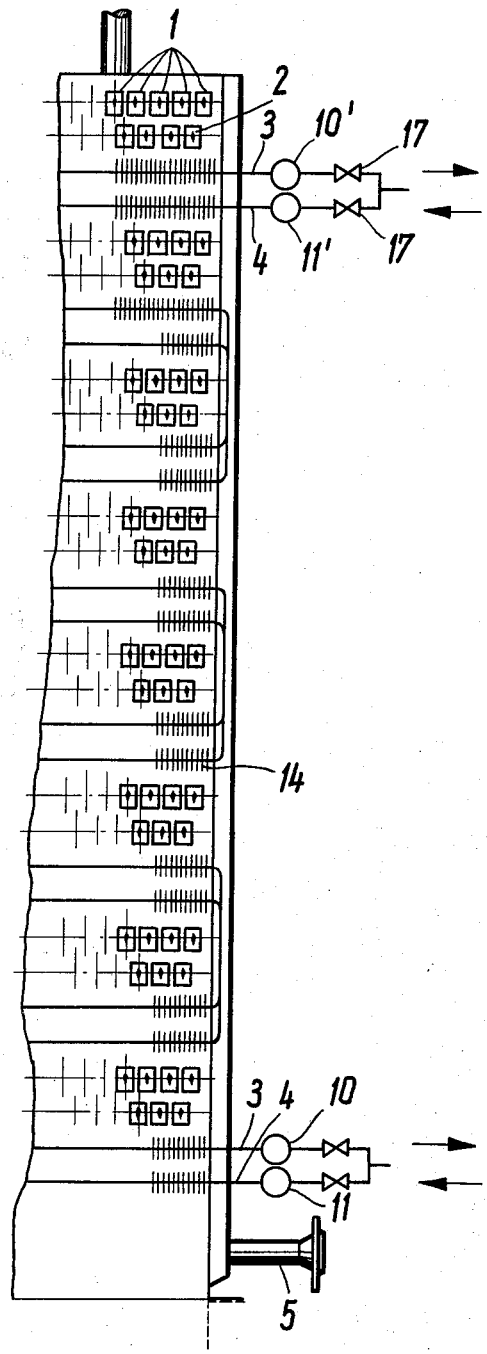
FIG. 1a is a showing of part of the desublimator of Fig. 1, in side elevation.

According to Figs. 1 and 1a, within the upstanding desublimator casing 12, which is constructed with a boxlike cross section which can be square or rectangular, there are disposed four heat exchanger batteries composed respectively of tube coils 1, 2, 3 and 4, each coil consisting of a plurality of fin tubes lying in the same plane. Each battery is connected to header pipes. The tube coils 1, making up one battery, are connected to header 8 and header 8'. Similarly tube coils 2, 3, and 4 are connected, respectively to headers 9, 10 and 11 and 9'10' and 11'. In FIG. 1, the heat exchanger systems 3 and 4 are arranged at right angles to the heat exchanger systems 1 and 2. An important aspect of this apparatus is the fin tube spacing $h_n$, which is determined on the basis of the desired concentration at the gas discharge 6 and is intentionally kept the same over the entire desublimator. This permits the three additional heat exchanger systems composed, respectively, of tube coils 2, 3 and 4 to be contained in the relatively great intervals which is provided between the successive tubes of coils 1. Valves 17 are provided permitting selective control of the coolant through the various headers. If desired the flow rates through the batteries can be varied automatically to compensate for build up of subliminate, as is described in said Ser. No. 784,284.

Figure 2:
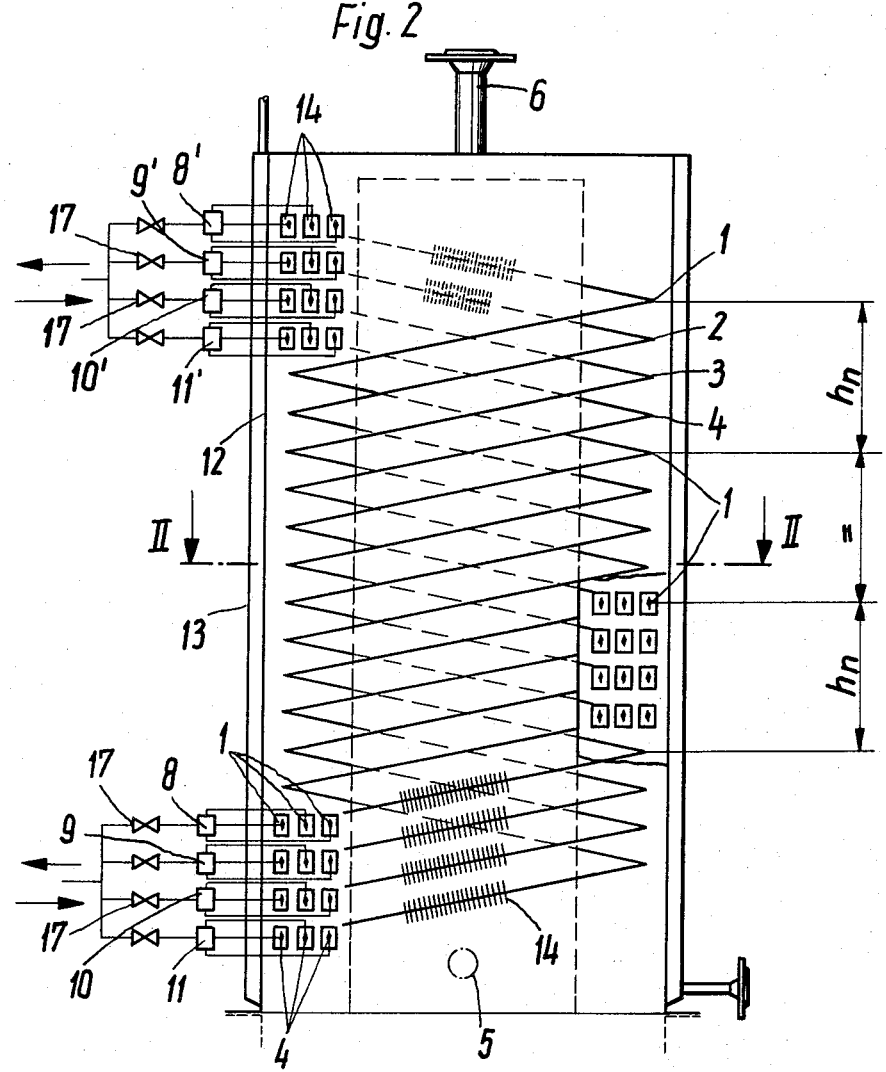
FIG. 2 is a vertical cross section of a round desublimator having four heat exchanger batteries or systems.
Figure 2A:
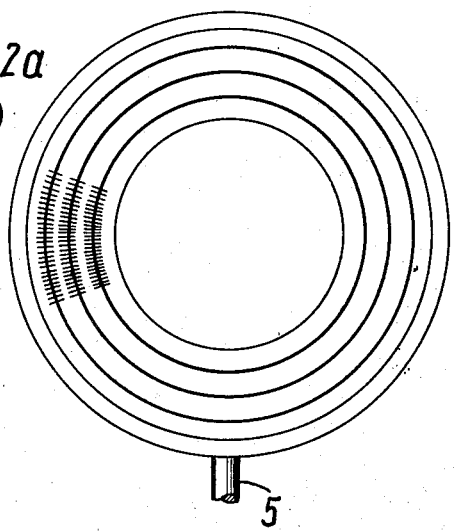
FIG. 2a is a cross section on Line II—II of Fig. 2.

The apparatus of Fig. 2 contains an arrangement of a plurality of heat exchanger batteries or systems composed respectively of tube coils 1, 2, 3 and 4 in an upstanding desublimator casing 12 of annular cross section. The important feature of this apparatus is, as in the case of the apparatus of Fig. 1, the fin tube spacing $h_n$ of one battery, say the battery of coils 1, and the arrangement of additional heat exchanger systems in these intervals $h_n$.

The operation of the desublimators of Figs. 1 and 2 is as follows. The vapor-gas mixture flows from the gas inlet 5 towards the gas outlet 6. Four exchanger batteries or systems, for example, are used in the apparatus. The heat transfer medium (e.g., Marlotherm or Diphyl, registered trademarks of Chemische Werke Hüls GmbH of Marl, and Farbenfabriken Bayer of Leverkusen, respectively) flows, however, through only one heat exchanger battery at a time, e.g., the battery composed of tube coils 1, so that no heat transfer takes place in the remaining three heat exchanger batteries. When a coating has formed on this heat exchanger system, so that an economical heat exchange can no longer take place, the next heat exchanger system is put into operation. When all the systems are coated, the sublimate can be melted in a known manner, with the same or a reversed direction of flow, in a single process step.

The valves 17 provide means for introducing coolant into the cooling batteries and for independently controlling flow of coolant therethrough. This permits shifting of the cooling load in timed sequence from battery to battery for compensating for accumulation of sublimate on the coils, to obtain uniformity of the desublimation.

As stated, the tubes of each coil are uniformly spaced from each other. That is, $h_n$ is a constant. Further, the tube coils of the respective batteries, are preferably interposed so that the successive tubes are uniformly spaced, along the path of the gas, from each other.

Each battery can be composed of any number of tube coils, though preferably, as is illustrated in the drawings, each of the batteries is composed of a plurality of tube coils interconnected for parallel flow of coolant therethrough and disposed at spaced intervals in the direction transverse to the flow of gas from the inlet to the outlet. Also as illustrated, preferably, the tubes are disposed in a substantially uniform array over the cross section of the separator transverse to the direction of flow of the gas therethrough.

Even without the precise mathematical derivation, the teaching of the invention can be empirically confirmed along general lines. This is to be explained by the following example.

EXAMPLE

PYROMELLITIC ACID DIANHYDRIDE (PMDA)

A vapor-gas mixture containing about 20 g/Nm$^3$ of polycarboxylic acid anhydrides of which 85 percent is PMDA, is treated so that the PMDA is separated in a degree of purity that makes further refinement unnecessary. The vapor-gas mixture is of the usual composition and is produced by a process for the production of said anhydrides from 1, 2, 4, 5-tetra-alkyl benzenes, the alkyls of which are methyl, ethyl and/or isopropyl, by catalytic gaseous phase oxidation.
A separator of the type represented in Fig. 1 is used for the desublimation of the PMDA.

The separator casing has a width of 0.55 m, a depth of 0.55 m, and height of 3.2 m. For a throughput of 75 Nm$^3$/h, this results in a residence time of 45 seconds. The temperature is about 25° C. at the inlet and 130° C. at the outlet. According to the formula on page 1 of the description, the necessary exchange surface area (in order to cool from 250° C. down to 130° C.) is calculated at 30 m$^2$. By means of a fin tube spacing ($h_n$ in Fig. 1) of 0.26 m which is uniform over the entire height, it is brought about that, of the 85 percent PMDA, approximately 80 percent is separated with a purity of better than 98 percent. The number of coils (1 in Fig. 1a) in the separator is 7; the coolant is introduced through header 8' and is passed counter currently to the direction to the flow of the gas-vapor mixture and escapes through header 8.

To improve the yield per unit-time, three additional heat exchanger systems having the same heat exchange surface area are installed in the intervals between the rows of fin tubes of the first system, so that a total exchange surface of 120 $m^2$ is available, of which only 30 $m^2$ is operative at any one time. The spacing $h_n$ for each of systems is the same i.e. $h_n$ is 0.26 m. The total number of coils 1, 2, 3, 4, (Fig. 1a) is four times the number of coils 1 (Fig. 1a) or 28.

What is claimed is:

1. A separator for fractional desublimation of a gas containing a component which can be separated by desublimation, comprising:
   a. an elongated housing having an inlet for introduction of the gas adjacent one end of the housing and an outlet for discharge of the gas adjacent the other end of the housing,
   b. a first cooling battery and a second cooling battery disposed in said housing, each of said batteries comprising at least one heat exchange tube coil providing tubes along the path of the gas from said inlet to said outlet for cooling the gas for the desublimation, the successive tubes of said tube coil of the first battery being interposed between successive tubes of said tube coil of the second battery,
   c. means for introducing coolant into the cooling batteries and means for independently controlling flow of coolant through the cooling batteries for permitting shifting of the cooling load in time sequence from battery to battery for compensating for accumulation of sublimate on the coils to obtain uniformity of the desublimation.

2. Separator according to claim 1, the tubes of each coil being uniformly spaced from each other.

3. Separator according to claim 2, said interpositioning of the tubes being so that the successive tubes are uniformly spaced from each other.

4. Separator according to claim 1, each of said batteries comprising a plurality of said tube coils interconnected for parallel flow of coolant therethrough and disposed at spaced intervals in the direction transverse to the flow of gas from the inlet to the outlet.

5. Separator according to claim 2, each of said batteries comprising a plurality of said tube coils interconnected for parallel flow of coolant therethrough and disposed at spaced intervals in the direction transverse to the flow of gas from the inlet to the outlet.

6. Separator according to claim 5, said housing being rectangular in the cross section between the inlet and outlet, said tubes being disposed in a substantially uniform array over said entire cross section.

7. Separator according to claim 6, said housing being annular in the cross section between the inlet and outlet, said tubes being disposed in a substantially uniform array over said entire cross section.

8. Separator according to claim 2, said uniform spacing of tubes being about 0.26 m.

9. Separator according to claim 5, said uniform spacing of tubes being about 0.26 m.

10. Separator according to claim 1, including in a housing of round cross section more than two cooling batteries, each as aforesaid for the first and second cooling battery.

11. Separator according to claim 1, including a third and fourth cooling battery, each as aforesaid for the first and second cooling battery.

12. Separator according to claim 2, including a third and fourth cooling battery, each as aforesaid for the first and second cooling battery.

13. Separator according to claim 3, including a third and fourth cooling battery, each as aforesaid for the first and second cooling battery.

14. Separator according to claim 4, including a third and fourth cooling battery, each as aforesaid for the first and second cooling battery.

* * * * *

UNITED STATES PATENT OFFICE
CERTIFICATE OF CORRECTION

Patent No. 3,693,707          Dated September 26, 1972

Inventor(s) Guenther Richter

It is certified that error appears in the above-identified patent and that said Letters Patent are hereby corrected as shown below:

Page 1, Foreign Application Priority Data
   change "Dec. 9, 1970" to --Dec. 9, 1967--.

Col. 5, line 21, change "25°" to -- 250°--.

Signed and sealed this 13th day of February 1973.

(SEAL)
Attest:

EDWARD M. FLETCHER, JR.
Attesting Officer

ROBERT GOTTSCHALK
Commissioner of Patents